(12) United States Patent
Kang et al.

(10) Patent No.: US 11,550,578 B2
(45) Date of Patent: Jan. 10, 2023

(54) DATA STORAGE APPARATUS INCLUDING SWAP MEMORY AND OPERATING METHOD THEREOF

(71) Applicant: SK hynix Inc., Icheon (KR)

(72) Inventors: Hye Mi Kang, Icheon (KR); Eu Joon Byun, Icheon (KR)

(73) Assignee: SK hynix Inc, Icheon (KR)

( * ) Notice: Subject to any disclaimer, the term of this patent is extended or adjusted under 35 U.S.C. 154(b) by 392 days.

(21) Appl. No.: 16/885,011

(22) Filed: May 27, 2020

(65) Prior Publication Data
US 2021/0141641 A1    May 13, 2021

(30) Foreign Application Priority Data
Nov. 7, 2019 (KR) .................. 10-2019-0141892

(51) Int. Cl.
  *G06F 9/48* (2006.01)
  *G06F 9/30* (2018.01)
  *G06F 9/50* (2006.01)
  *G06F 12/02* (2006.01)
  *G06F 9/54* (2006.01)

(52) U.S. Cl.
  CPC ............ *G06F 9/3009* (2013.01); *G06F 9/485* (2013.01); *G06F 9/5016* (2013.01); *G06F 9/542* (2013.01); *G06F 12/0246* (2013.01); *G06F 12/0292* (2013.01); *G06F 2212/7207* (2013.01)

(58) Field of Classification Search
  CPC ....................................................... G06F 9/485
  See application file for complete search history.

(56) References Cited

U.S. PATENT DOCUMENTS 6,006,247 A * 12/1999 Browning ............. G06F 9/4812
                                                                  718/102
7,478,388 B1 * 1/2009 Chen .................... G06F 9/45554
                                                                  718/1

FOREIGN PATENT DOCUMENTS

| KR | 20120036311 A | 4/2012 |
| KR | 20180018886 A | 2/2018 |
| KR | 20180044095 A | 5/2018 |

* cited by examiner

*Primary Examiner* — Charlie Sun (57) ABSTRACT

A data storage apparatus includes a storage device; a controller to control data input and output operations of the storage device; and a swap memory provided in an outside of the controller, wherein the controller includes a thread manager to perform a preparation operation on a first thread included in a task in response to a request for processing the task, request the storage device to process the first thread on which the preparation operation has been performed, perform a preparation operation on at least one subsequent thread following the first thread while the storage device processes the first thread, and store context data of the first thread and the at least one subsequent thread in the swap memory, wherein the task includes the first thread and the at least one subsequent thread, and the preparation operation includes an address mapping operation.

20 Claims, 8 Drawing Sheets

DATA STORAGE APPARATUS INCLUDING SWAP MEMORY AND OPERATING METHOD THEREOF

CROSS-REFERENCES TO RELATED APPLICATION

The present application claims priority under 35 U.S.C. § 119(a) to Korean Patent Application Number 10-2019-0141892, filed on Nov. 7, 2019, in the Korean Intellectual Property Office, which is incorporated herein by reference in its entirety.

BACKGROUND

1. Technical Field

Various embodiments relate to a semiconductor integrated apparatus, and more particularly, to a data storage apparatus including a swap memory, and an operating method thereof.

2. Related Art

Storage apparatuses are coupled to a host and perform data input and output operations according to a request from the host. The storage apparatuses may employ various storage media for storing data.

The storage apparatuses may include an apparatus configured to store data in a magnetic disc such as a hard disc drive (HDD), a semiconductor memory device, and so on. The semiconductor memory device may include a device configured to store data in a nonvolatile memory, such as a solid state drive (SSD), a memory card, or the like. The nonvolatile memory may include a flash memory.

Storage media using flash memories have large capacity, nonvolatility, low cost, low power consumption, a high data processing rate, and the like.

SUMMARY

In an embodiment of the present disclosure, a data storage apparatus may include: a storage device; a controller to control data input and output operations of the storage device; and a swap memory provided in an outside of the controller, wherein the controller includes a thread manager to perform a preparation operation on a first thread included in a task in response to a request for processing the task, request the storage device to process the first thread on which the preparation operation has been performed, perform a preparation operation on at least one subsequent thread following the first thread while the storage device processes the first thread, and store context data of the first thread and the at least one subsequent thread in the swap memory, wherein the task includes the first thread and the at least one subsequent thread, and the preparation operation includes an address mapping operation.

In an embodiment of the present disclosure, a data storage apparatus may include: a storage device; a controller to control data input and output operations of the storage device; and at least one swap memory provided in an outside of the controller, wherein the controller includes a thread manager to perform a preparation operation on a target thread to be processed by the storage device, request the storage device to process the target thread on which the preparation operation has been performed, store context data of the target thread in the at least one swap memory, and perform a preparation operation on a subsequent thread following the target thread during at least a part of a duration that the storage device processes the target thread, wherein the preparation operation includes an address mapping operation.

In an embodiment of the present disclosure, an operating method of a data storage apparatus the method comprising: receiving, by a controller, an event for processing a task including at least one thread; performing, by the controller, a preparation and attribute confirmation operation on a first thread of the task, the preparation and attribute confirmation operation including an address mapping operation for a storage device which is to process the first thread; determining, by the controller, whether or not a target region of the storage device to process the first thread is in an idle state when the first thread is a thread which needs to access the storage device; requesting the target region to process the first thread and storing context data of the first thread in a swap memory when the target region is in the idle state, by the controller; and performing, by the controller, the preparation and attribution confirmation operation on a subsequent thread following the first thread during at least a part of a duration that the target region processes the first thread, wherein the swap memory is provided in an outside of the controller.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention are described in greater detail below with reference to the accompanying drawings. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment" or the like is not necessarily to only one embodiment, and different references to any such phrase are not necessarily to the same embodiment(s).

It will be understood that when an element is referred to as being "connected to" or "coupled with" another element, it can be directly connected or coupled with the other element. It will be further understood that the terms "comprises" and/or "comprising," when used in this specification, do not preclude the existence or addition of other non-stated elements. Similarly, the indefinite articles "a" and "an" indicate one or more, unless stated or the context clearly indicates only one.

Figure 1:
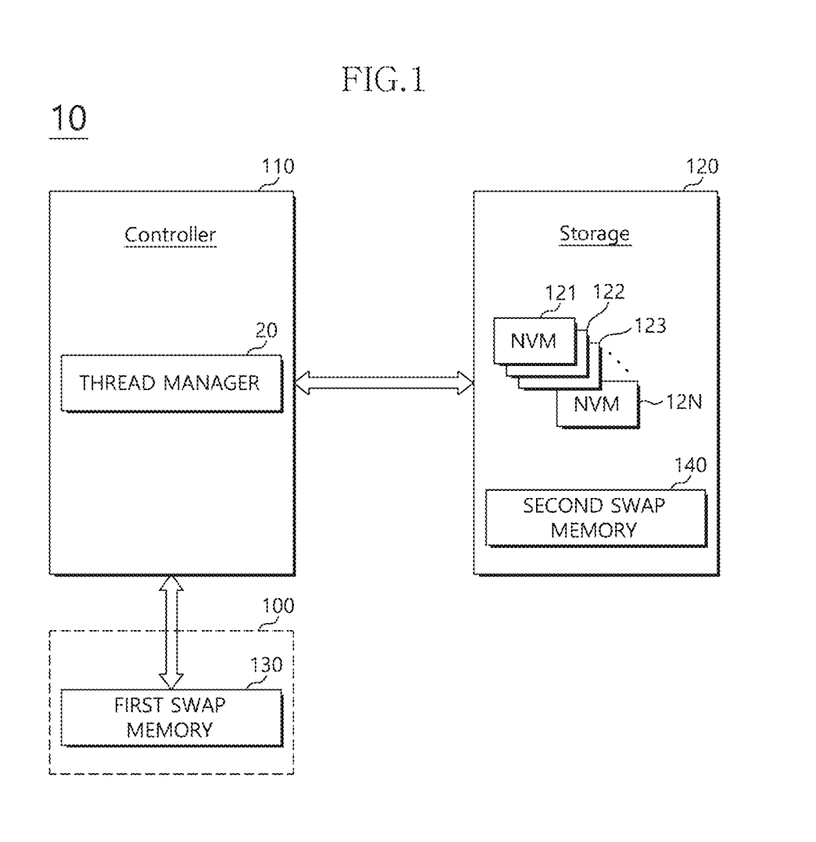
FIG. 1 is a diagram illustrating a data storage apparatus according to an embodiment of the present disclosure.

FIG. 1 is a diagram illustrating a data storage apparatus 10 according to an embodiment.

Referring to FIG. 1, the data storage apparatus 10 may include a controller 110, storage 120, and at least one swap memory 130 or 140.

The controller 110 may control the storage 120 in response to a request of a host 100. For example, the controller 110 may control data to be programmed in the storage 120 in response to a program (or write) request from the host 100. The controller 110 may provide data stored in the storage 120 to the host 100 in response to a read request from the host 100.

The storage 120 may store data or output stored data according to control of the controller 110. The storage 120 may be configured of a volatile or nonvolatile memory device. In an embodiment, the storage 120 may be implemented using a memory device selected among various nonvolatile memory devices such as an electrically erasable and programmable read only memory (EEPROM), a NAND flash memory, a NOR flash memory, a phase-change random access memory (PRAM), a resistive RAM (ReRAM), a ferroelectric RAM (FRAM), a spin torque transfer magnetic RAM (STT-MRAM), and the like. The storage 120 may include a plurality of nonvolatile memory modules (NVMs) 121 to 12N, for example, a plurality of dies, a plurality of chips, or a plurality of packages. The storage 120 may include a single-level cell (SLC) in which one-bit data is stored or a multi-level cell (MLC) in which multi-bit data is stored. In an embodiment, a memory region including the SLC may operate at a higher speed than a memory region including the MLC.

In an embodiment, the controller 110 may include a thread manager 20. A thread may be a processing unit of task processed through the controller 110.

A operation for processing a request or a command from the host 100 may include at least one thread. The controller 110 may autonomously manage the storage 120 by performing a background operation, and the background operation may also include at least one thread. The background operation may include wear leveling, garbage collection, bad block management, and the like. Depending on a type of the request of the host 100 and a type of the background operation, the thread may be classified into a thread which needs to access the storage 120, such as a thread for a read, write, or erase operation or wear levelling, and a thread which does not need to access the storage 120, such as a thread for bad block management.

In an embodiment, the thread manager 20 may perform a preparation operation for processing a thread constituting a task when the task is to be processed according to the request from the host 100 or when the background operation occurs. The preparation operation may include a logical-to-physical address translation operation using a map table and a metadata management operation for managing the map table. When the thread to be processed is a thread which needs to access the storage 120, the thread manager 20 may be configured to request processing of a preparation-completed thread on which the preparation operation has been completed to the storage 120 that is in an idle state, and store context data of the preparation-completed thread in the at least one swap memory 130 or 140. The context data of the preparation-completed thread being processed may be swapped to another memory device in the outside of the controller 110, and thus an available memory space in the controller 110 may be secured. Therefore, the thread manager 20 may perform the preparation operation on a subsequent thread for at least a part of a duration that the storage 120 processes the preparation-completed thread.

Context data may be thread status information which includes data related to a thread to be executed or being executed. The data related to the thread may include a program code, a pointer indicating an execution position of a program, register values such as variables, arrangement, structures, and the like used for executing the program, data generated by executing the program, and the like.

In another aspect, the thread manager 20 may perform a preparation operation including address mapping on a first thread according to a request of the host 100 or a background operation, and request processing of the first thread to a target region of the storage 120. While the first thread is processed in the target region of the storage 120, the thread manager 120 may perform a preparation operation on at least one subsequent thread following the first thread. Context data related to the first thread and the at least one subsequent thread may be stored in the at least one swap memory 130 or 140.

In an embodiment, at least one swap memory included in the data storage apparatus 10 may include at least one of a first swap memory 130 and a second swap memory 140.

The first swap memory 130 may be allocated to a memory of the host 100, but embodiments are not limited thereto.

When the storage 120 includes a high-speed memory region and a low-speed memory region, the second swap memory 140 may be allocated to the high-speed memory region in the storage 120, for example, an SLC memory region, but embodiments are not limited thereto.

In the data storage apparatus 10 using a flash memory device as the storage 120, because an operation speed of the storage 120 is slower than that of the controller 110, the controller 110 has to wait in an idle state until the storage 120 completes the processing of a target thread. Therefore, in order to perform a preparation operation on a subsequent thread of the target thread in advance during the waiting time of the controller 110, the controller 110 needs to include an expensive static random access memory (SRAM) to store context data of the target thread and the subsequent thread, and thus the additional costs may be incurred.

In accordance with an embodiment, a portion of a memory outside the controller 110 may be used as a swap memory. For example, a portion of the memory of the host 100 and a portion of the storage 120 may be used as the first and second swap memories 130 and 140, respectively. Thus no additional memory may be necessary, and high-speed access to the first and second swap memories 130 and 140 may be possible. Therefore, a multi-thread operation for processing multiple threads in may be achieved by the controller 110 without additional costs.

In response to a data read, write, or erase request from the host 100 or according to triggering of a background operation of the controller 110, the thread manager 20 may perform a preparation operation including an address mapping operation on a unit thread of a corresponding task. An address management operation may include the address mapping operation and a metadata management operation for managing a map table. In case of the background operation such as wear leveling and garbage collection, the preparation operation may further include a block management operation.

The thread on which the preparation operation has been completed, i.e., the preparation-completed thread, may wait in a preparation-completed state, for example, in a state ready to be processed by the storage 120, and the controller 110 may request the processing of the preparation-completed thread to the storage 120 when the target region of the storage 120, which is to process the preparation-completed thread, is in an idle state.

The target region, which receives a request for processing the preparation-completed thread, may be transited to a busy state, and context data related to the preparation-completed thread being processed may be stored in at least one of the first and second swap memories 130 and 140. If necessary, for example, when an operation for processing the preparation-completed thread is resumed after interruption on the operation occurred, the context data stored in at least one of the first and second swap memories 130 and 140 may be reloaded into the controller 110.

When the target region which is to process the preparation-completed thread is in the busy state, the thread manager 20 may store the context data of the preparation-completed thread in at least one of the first and second swap memories 130 and 140 and may allow the preparation-completed thread to wait for the processing until the target region is changed to the idle state.

The thread manager 20 may manage, for a thread identifier (ID) of each thread, thread information including an identifier (ID or address) of a target region of the storage 120, a thread attribute, and a thread preparation state. With reference to a thread identifier, the thread manager 20 may reload context data of a thread when an operation for processing the thread is resumed after the interruption, or may determine whether or not a target region is transited to an idle state through periodic polling, extract a thread for the target region transited to the idle state, and request processing of the thread to the target region. The thread manager 20 may also complete preparation for a preparation-uncompleted thread with reference to a thread preparation state.

In an embodiment, while the storage 120 processes a specific thread, the thread manager 20 may perform a preparation operation on a subsequent thread requested to be subsequently processed. When the interruption or the like occurs while the preparation operation is performed on the subsequent thread, for example, before the preparation operation is completed, the thread processing operation of the storage 120 and the preparation operation of the thread manager 20 may be suspended. When the preparation operation is suspended, the thread manager 20 may store thread information of the preparation-suspended thread therein and store context data related to the preparation-suspended thread in at least one of the first and second swap memories 130 and 140. After the interruption is cleared in the controller 110, the thread manager 20 may reload the context data of the processing-suspended thread and allow the storage 120 to resume the processing of the processing-suspended thread. In addition, the thread manager 20 may complete the preparation operation for the preparation-suspended thread and update the thread information of the corresponding thread and the context data stored in at least one of the first and second swap memories 130 and 140.

Figure 2:
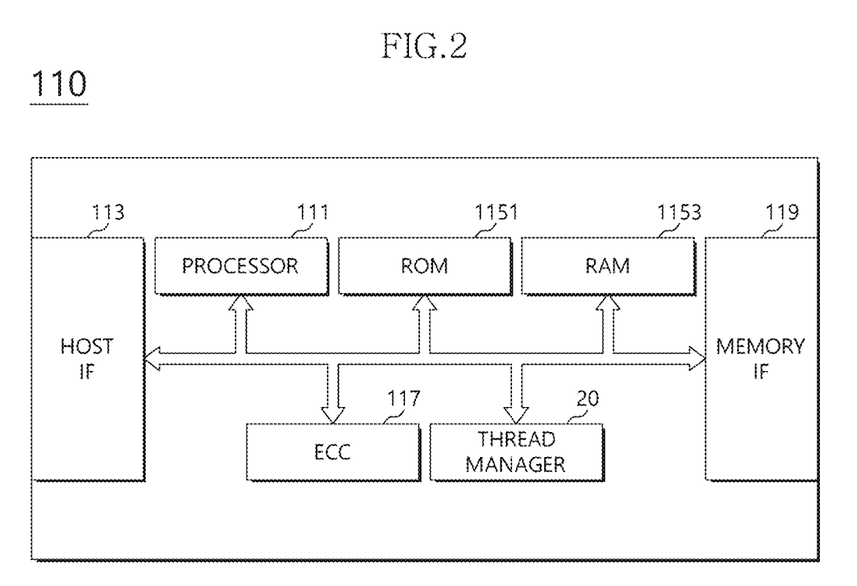
FIG. 2 is a diagram illustrating a controller according to an embodiment of the present disclosure.

FIG. 2 is a diagram illustrating a controller according to an embodiment. The controller shown in FIG. 2 may correspond to the controller 110 shown in FIG. 1.

Referring to FIG. 2, the controller 110 may include a processor 111, a host interface 113, a read only memory (ROM) 1151, a random access memory (RAM) 1153, an error correction code (ECC) circuit 117, a memory interface 119, and the thread manager 20.

The processor 111 may be configured to transfer various control information required for processing a task such as a data read or write operation that is to be performed in the storage 120 to the host interface 113, the RAM 1153, the ECC circuit 117, the memory interface 119, and the thread manager 20. In an embodiment, the processor 111 may operate according to firmware provided for various operations of the data storage apparatus 10. In an embodiment, the processor 111 may perform functions of a flash translation layer (FTL) for performing address mapping for managing the storage 120, wear leveling, garbage collection, bad block management, and the like.

The host interface 113 may receive a command and a clock signal from the host 100 and provide a communication channel for controlling data input and output, according to control of the processor 111. The host interface 113 may provide physical connection between the host 100 and the data storage apparatus 10. The host interface 110 may perform interfacing with the host 100 according to a bus format of the host 100. The bus format of the host 100 may include at least one of standard interface protocols such as a secure digital (SD) protocol, a universal serial bus (USB) protocol, a multi-media card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol.

Program codes, for example, firmware or software, required for an operation of the controller 110 may be stored in the ROM 1151, and code data and the like used by the program codes may be stored in the ROM 1151.

Data required for an operation of the controller 110 may be stored in the RAM 1153, and data, for example, a map table generated by the controller 110 may be stored in the RAM 1153.

The ECC circuit 117 may detect an error bit of data read out from the storage 120 and correct the detected error bit. The ECC circuit 117 may be implemented in the processor 111.

The memory interface 119 may provide a communication channel for exchanging signals between the controller 110 and the storage 120. The memory interface 119 may write data received through the host interface 113 in the storage 120 according to control of the processor 111. The memory interface 119 may transfer data read out from the storage 120 to the host interface 113.

The thread manager 20 may be configured to allow a thread included in a task, which is caused by a request from the host 100 or a background operation of the controller 110, to be prepared for processing and store context data of a thread being prepared or a preparation-completed thread in at least one of the first and second swap memories 130 and 140. The thread manager 20 may manage thread information including a thread ID, a target region ID, a thread attribute, and a thread preparation state. The thread manager 20 may load the context data of the thread being processed or a thread to be processed from at least one of the first and second swap memories 130 and 140, so that the context data is to be used for processing the thread.

In an embodiment, while the storage 120 processes a specific thread, the thread manager 20 may perform a preparation operation on at least one subsequent thread and store context data of a preparation-completed thread in at least one of the first and second swap memories 130 and 140.

In an embodiment, the thread manager 20 may be implemented using a processor, e.g., the processor 111, or may be implemented using another processor. The thread manager 20 may further include a storage region such as a register or the like to store thread information.

Figure 3:
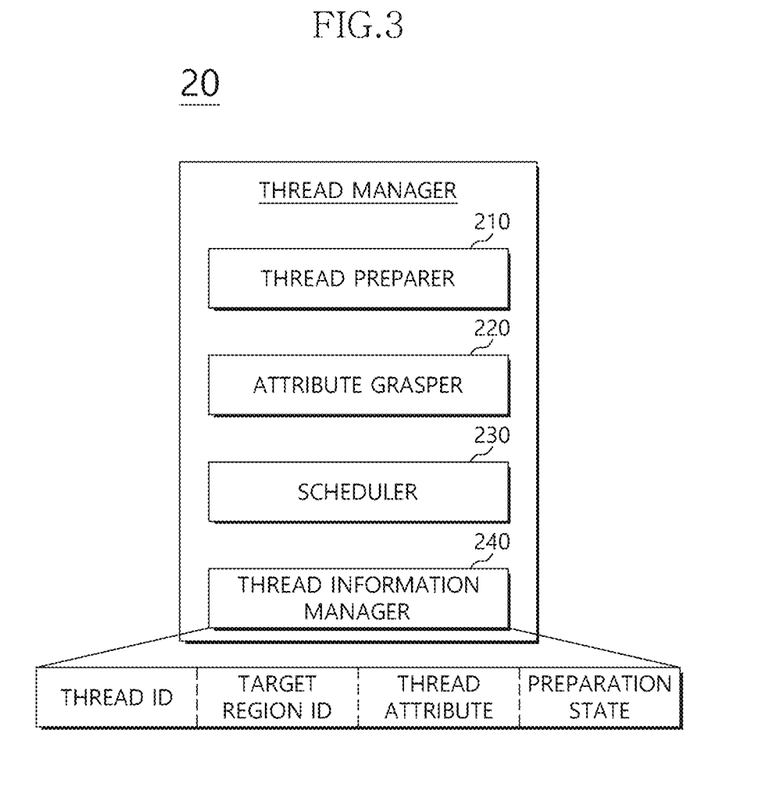
FIG. 3 is a diagram illustrating a thread manager according to an embodiment of the present disclosure.

FIG. 3 is a diagram illustrating a thread manager according to an embodiment. The thread manager shown in FIG. 3 may correspond to the thread manager 20 shown in FIGS. 1 and 2.

Referring to FIG. 3, the thread manager 20 may include a thread preparer 210, an attribute grasper 220, a scheduler 230, and a thread information manager 240.

The thread information manager 240 may be configured to manage a target region ID, a thread attribute, and a thread preparation state with respect to each of thread IDs. The target region ID may be used to identify a target region in which a corresponding thread is to be processed.

The thread preparer 210 may perform a preparation operation on a thread to be processed according to a request from the host 100 or a background operation. The preparation operation may include an address management operation. The address management operation may include an address mapping operation and a metadata management operation for managing a map table. In case of the background operation such as wear leveling and garbage collection, the preparation operation may further include a block management operation.

The thread information manager 240 may manage the thread information by adding a thread ID of a specific thread being prepared by the thread preparer 210 to the thread information. The thread information manager 240 may manage a preparation state field of the specific thread according to whether or not the preparation operation is completed on the specific thread. When the preparation operation is completed on the specific thread, the thread information manager 240 may mark the preparation state field as a preparation completion state. When the interruption occurs before the preparation operation for the specific thread is completed, the preparation operation may be suspended and the preparation state field may be marked as a preparation incompletion state.

The attribute grasper 220 may grasp a type of the specific thread being prepared. For example, the attribute grasper 220 may grasp whether the specific thread being prepared is a thread which needs to access the storage 120, such as a thread for a read, write, or erase operation, or wear levelling, or a thread which does not need to access the storage 120, such as a thread for bad block management.

The thread information manager 240 may manage a target region ID field and a thread attribute field of the specific thread according to the type of the specific thread that is grasped by the attribute grasper 220.

The scheduler 230 may confirm a state of the storage 120 every fixed period or according to a previously determined policy. When a target region in which the specific thread is to be processed is in an idle state, the scheduler 230 may request processing of the specific thread to the target region and store context data of the specific thread in at least one of the first and second swap memories 130 and 140.

When there are a plurality of threads on which the preparation operation has been completed, the scheduler 230 may determine a processing order of the plurality of threads according to a pre-set priority policy.

When it is determined that a preparation-completed thread is a thread which needs to access the storage 120 and a target region which is to process the preparation-completed thread is in an idle state by referring to the thread attribute field of the thread information, the scheduler 230 may request processing of the preparation-completed thread to the storage 120 and store context data of the preparation-completed thread in at least one of the first and second swap memories 130 and 140. When the preparation-completed thread is a thread which does not need to access the storage 120, the scheduler 230 may allow the preparation-completed thread to be processed by an internal operation of the controller 110.

As described above, in the present technology, since a memory space within the controller 110 may be ensured by swapping context data of a specific thread being processed to a memory device in the outside of the controller 110, a preparation operation may be performed on a subsequent thread in advance for at least a part of a duration that the storage 120 processes the specific thread.

Figure 4:
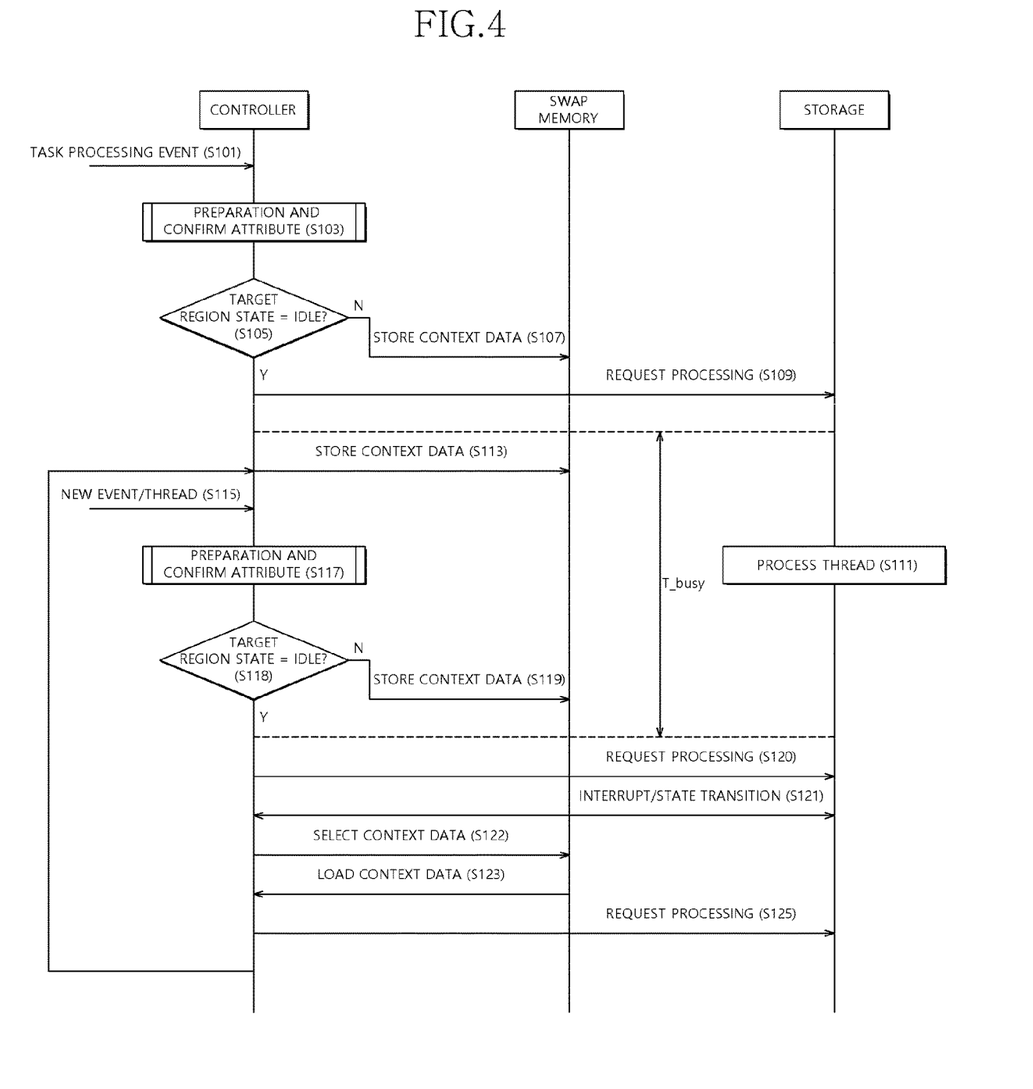
FIG. 4 is a flowchart illustrating an operating method of a data storage apparatus according to an embodiment of the present disclosure.

FIG. 4 is a flowchart explaining an operating method of a data storage apparatus according to an embodiment. The operating method of FIG. 4 will be described with reference to the data storage apparatus 10 shown in FIGS. 1 to 3.

As a task processing event occurs according to a request from the host 100 or triggering of a background operation in the controller 110 at S101, the controller 110 may perform a preparation and attribute confirmation process on a specific thread of a target task at S103.

In an embodiment, the preparation and attribute confirmation process may include a preparation operation including an address management operation and an operation for confirming whether or not the specific thread is a thread which needs to access the storage 120, i.e., a thread attribute of the specific thread. The address management operation may include an address mapping operation and a metadata management operation for managing a map table. In case of a background operation such as wear leveling and garbage collection, the preparation operation may further include a block management operation.

When it is determined that the specific thread is a thread which does not need to access the storage 120 as a result of confirming the thread attribute, the controller 110 may internally process the specific thread.

When it is determined that the specific thread is a thread which needs to access the storage 120 as the result of confirming the thread attribute, the controller 110 may confirm whether or not a target region to process the specific thread is in an idle state at S105. The target region is included in the storage 120.

When the target region is not in the idle state (S105: N), for example, when the specific thread cannot be immediately processed in the target region of the storage 120, the controller 110 may store thread information for the specific thread on which the preparation operation has been completed, i.e., the preparation-completed thread, in an internal memory thereof and store context data of the preparation-completed thread in a swap memory, i.e., at least one of the first and second swap memories 130 and 140, at S107.

When it is determined that the target region is in the idle state (S105: Y), the controller 110 may request the target region to process the specific thread at S109. Thus the storage 120 may process the specific thread and the target region of the storage 120 may be transited to a busy state at S111. While the storage 120 processes the specific thread (T_busy), the controller 110 may store and retain the context data of the specific thread in at least one of the first and second swap memories 130 and 140 at S113.

The controller 110 may control processing for at least one subsequent thread to be prepared during at least a part of the duration T_busy that the storage 120 is in the busy state. Specifically, at S115, the controller 110 may receive a new task processing event or a new thread following the specific thread after the processing of the specific thread is started by the storage 120.

The controller 110 may perform a preparation and attribute confirmation operation on the new thread at S117. When it is determined that the new thread is a thread which does not need to access the storage 120 as a result of confirming a thread attribute of the new thread, the controller 110 may internally process the new thread.

When it is determined that the new thread is a thread which needs to access the storage 120 as the result of confirming the thread attribute, the controller 110 may confirm whether or not a target region to process the new thread is in an idle state at S118.

When the target region is not in the idle state (S118: N), the controller 110 may store thread information for the new thread on which the preparation operation has been performed, i.e., the pre-preparation-completed thread, in the internal memory thereof and store context data corresponding to the pre-preparation-completed thread in at least one of the first and second swap memories 130 and 140 at S119.

When the target region is in the idle state (S118: Y), the controller 110 may request the target region to process the pre-preparation-completed thread at S120 and thus the target region of the storage 120 may be transited to a busy state.

When the interruption occurs in the storage 120 or when the target region is transited from the busy state to the idle state, the controller 110 may recognize a state of the storage 120 at S121. In an embodiment, the controller 110 may confirm whether or not the target region of the storage 120 is in the idle state by polling the state of the storage 120.

When the interruption occurs in the data storage apparatus 10 during the thread processing, the controller 110 may temporarily suspend the processing of the thread being executed and process the interruption. After the interruption is cleared, the controller 110 may access at least one of the first and second swap memories 130 and 140 and select context data of the temporarily suspended thread at S122. The selected context data may be loaded into the controller 110 from at least one of the first and second swap memories 130 and 140 at S123 and the controller 110 may request the storage 120 to resume the thread processing at S125.

When the target region is transited from the busy state to the idle state, the controller 110 may access at least one of the first and second swap memories 130 and 140 and confirm whether or not there is a thread to be processed in the target region transited to the idle state at S122. When there is the thread to be processed in the target region, the controller 110 may load context data corresponding to the thread to be processed from at least one of the first and second swap memories 130 and 140 at S123 and request the storage 120 to process the thread at S125. While the thread is processed in the storage 120, the controller 110 may proceed to S115 to perform the preparation and attribute confirmation operation on another new thread.

In an embodiment, the preparation-completed thread may wait in a preparation-completed state, for example, in a state to be immediately processable by the storage 120. When the target region of the storage 120, which is to process the preparation-completed thread, is determined to be in the idle state, the controller 110 may request the storage 120 to process the preparation-completed thread. When the target region of the storage 120, which is to process the preparation-completed thread, is determined to be in the busy state, the thread manager 20 may store context data of the preparation-completed thread in at least one of the first and second swap memories 130 and 140 and allow the preparation-completed thread to wait until the target region is transited to the idle state.

In an embodiment, when the interruption occurs before the preparation operation for a thread is completed, the thread manager 20 of the controller 110 may suspend the preparation operation and store context data of the preparation-suspended thread. After the interruption is cleared, the thread manager 20 may complete the suspended preparation operation on the preparation-suspended thread while the storage 120 resumes and processes the previously requested thread, and then update the context data of the preparation-suspended thread according to the completion of the resumed preparation operation.

Figure 5:
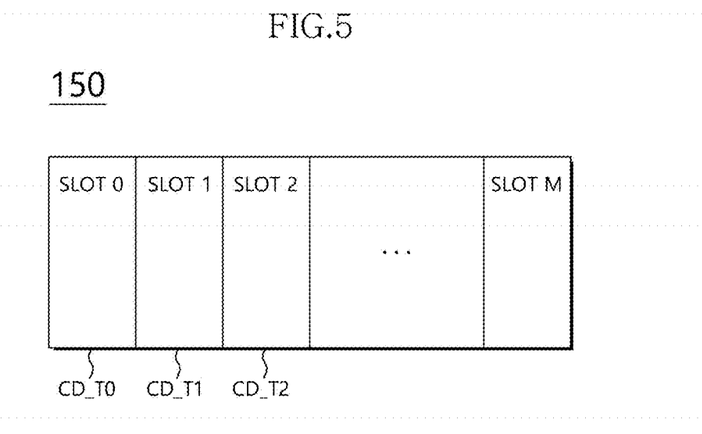
FIG. 5 is a diagram explaining a context data management concept for thread processing statuses according to an embodiment of the present disclosure.
Figure 6:
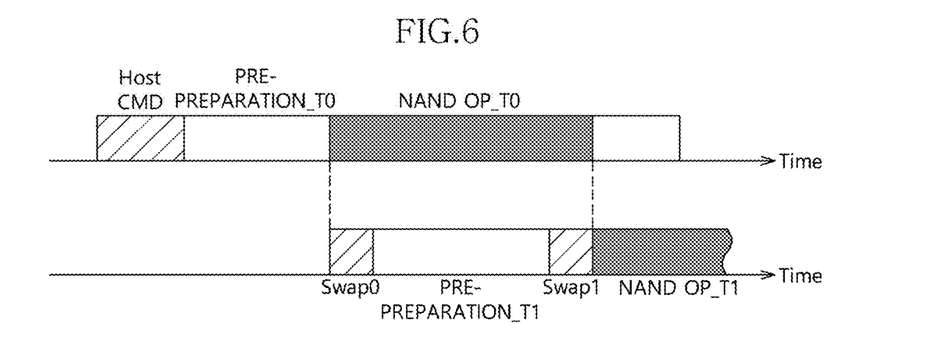
FIG. 6 is a timing diagram explaining an operating method of a data storage apparatus according to an embodiment of the present disclosure.

FIG. 5 is a diagram explaining a context data management concept for each status of processing a thread according to an embodiment, and FIG. 6 is a timing diagram explaining an operation method of a data storage apparatus according to an embodiment.

A plurality of slots SLOT 0 to SLOT M may be allocated to a swap memory 150. The swap memory 150 may be the first swap memory 130 located in the host 100 or the second swap memory 140 located in the storage 120.

Context data CD_Tx for a plurality of threads may be stored in the slots SLOT 0 to SLOT M, respectively.

For example, in response to a command processing request Host CMD from the host 100, the controller 110 may perform a preparation operation on a thread 0 T0 included in a command corresponding to the command processing request Host CMD. Context data CD_T0 of the preparation-completed thread 0 T0 may be stored in the slot SLOT 0 of the swap memory 150 (Swap0 of FIG. 6) and the context data CD_T0 may be retained in the slot SLOT 0 while the storage 120 processes the thread 0 T0.

For at least a part of a duration NAND OP_T0 that the storage 120 processes the thread 0 T0, the controller 110 may perform a preparation operation on a subsequent thread 1 T1 and store context data CD_T1 of the subsequent thread 1 T1 in the slot SLOT 1 of the swap memory 150 (Swap1 of FIG. 6).

While the storage 120 processes the thread 1 T1 (NAND OP_T1), a preparation operation on another subsequent thread following the thread 1 T1 may be performed and context data CD_T2 of the other subsequent thread may be stored in the slot SLOT 2 of the swap memory 150.

When the preparation operation is suspended by the interruption before the preparation operation is completed, context data generated until the interruption occurs may be stored in the swap memory 150. When the suspended preparation operation is resumed after the interruption is cleared, the context data may be updated.

Figure 7:
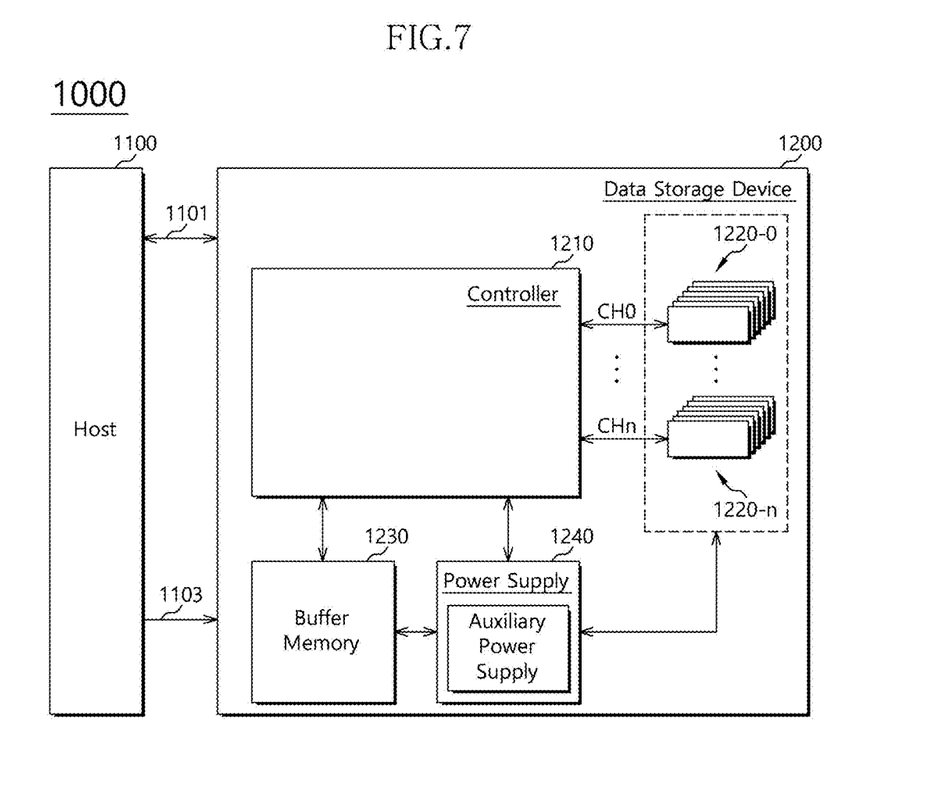
FIG. 7 is a diagram illustrating a data storage system in accordance with an embodiment.

FIG. 7 is a diagram illustrating a data storage system 1000 in accordance with an embodiment.

Referring to FIG. 7, the data storage system 1000 may include a host device 1100 and a data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured of the controller 110 shown in FIGS. 1 and 2. The data storage system 1000 may be configured to implement the data storage apparatus 10 of FIG. 1 therein. For example, a swap memory may be allocated to at least one of the host device 1100 and the plurality of nonvolatile memory devices 1220-0 to 1220-n.

The host device 1100 may exchange signals with the data storage device 1200 through the signal connector 1101. The signals may include a command, an address, data, and so forth.

The controller 1210 may analyze and process the signals received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n, and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to supply the power for allowing the data storage device 1200 to be normally terminated when the sudden power interruption occurs.

The signal connector 1101 may include one or more of various types of connectors depending on an interface scheme between the host device 1100 and the data storage device 1200.

The power connector 1103 may include one or more of various types of connectors depending on a power supply scheme of the host device 1100.

Figure 8:
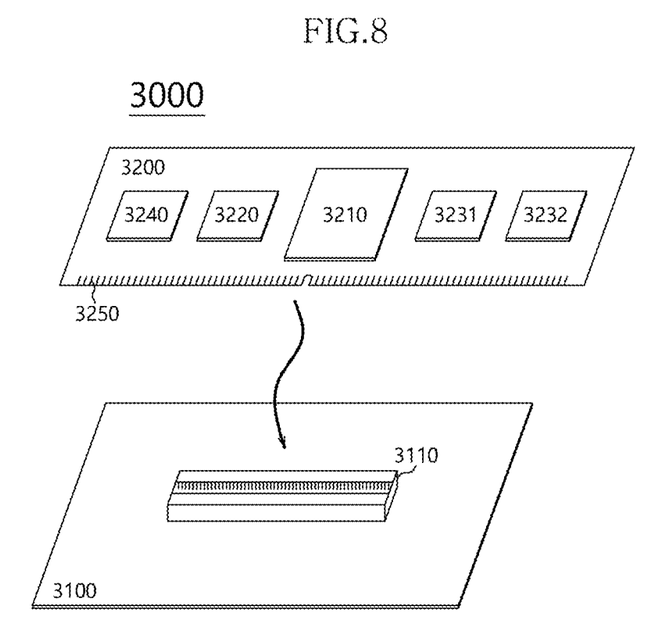
FIG. 8 is a diagram illustrating a data processing system including a data storage apparatus in accordance with an embodiment.

FIG. 8 is a diagram illustrating a data processing system 3000 in accordance with an embodiment. Referring to FIG. 8, the data processing system 3000 may include a host device 3100 and a memory system 3200.

The host device 3100 may be configured in the form of a board such as a printed circuit board. Although not shown, the host device 3100 may include internal function blocks for performing functions of the host device 3100.

The host device 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2. The data processing system 3000 may be configured to implement the data storage apparatus 10 of FIG. 1 therein. For example, a swap memory may be allocated to at least one of the host device 3100 and the nonvolatile memory devices 3231 and 3232.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminals 3110 and 3250, signals such as commands, addresses, data, and so forth, and power may be transferred between the host device 3100 and the memory system 3200. The connection terminal 3250 may include one or more of various types depending on an interface scheme between the host device 3100 and the memory system 3200. The connection terminal 3250 may be disposed on a side of the memory system 3200, as shown.

Figure 9:
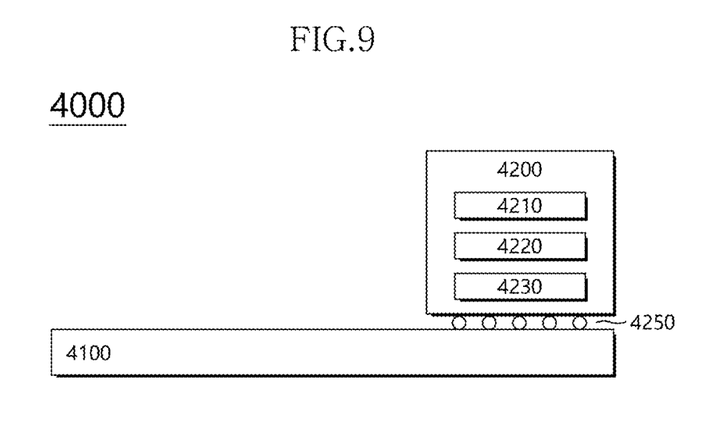
FIG. 9 is a diagram illustrating a data processing system including a data storage apparatus in accordance with an embodiment.

FIG. 9 is a diagram illustrating a data processing system 4000 in accordance with an embodiment. Referring to FIG. 9, the data processing system 4000 may include a host device 4100 and a memory system 4200.

The host device 4100 may be configured in the form of a board such as a printed circuit board. Although not shown, the host device 4100 may include internal function blocks for performing functions of the host device 4100.

The memory system 4200 may be configured in the form of a surface-mounted type package. The memory system 4200 may be mounted on the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2. The data processing system 4000 may be configured to implement the data storage apparatus 10 of FIG. 1 therein. For example, a swap memory may be allocated to at least one of the host device 4100 and the nonvolatile memory device 4230.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as a storage medium of the memory system 4200.

Figure 10:
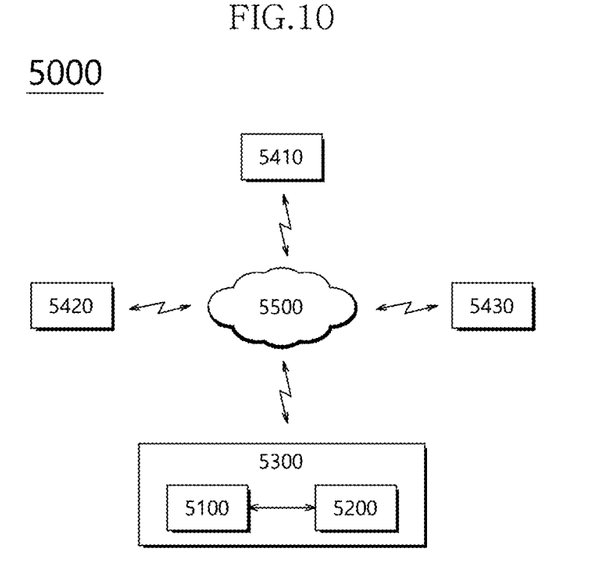
FIG. 10 is a diagram illustrating a network system including a data storage apparatus in accordance with an embodiment.

FIG. 10 is a diagram illustrating a network system 5000 including a data storage apparatus in accordance with an embodiment. Referring to FIG. 10, the network system 5000 may include a server system 5300 and a plurality of client systems 5410, 5420, and 5430, which are coupled through a network 5500.

The server system 5300 may serve data in response to requests from the plurality of client systems 5410 to 5430. For example, the server system 5300 may store the data provided by the plurality of client systems 5410 to 5430. In another example, the server system 5300 may provide data to the plurality of client systems 5410 to 5430.

The server system 5300 may include a host device 5100 and a memory system 5200. The memory system 5200 may be configured as the data storage apparatus 10 shown in FIG. 1, the data storage device 1200 shown in FIG. 7, the memory system 3200 shown in FIG. 8, or the memory system 4200 shown in FIG. 9.

Figure 11:
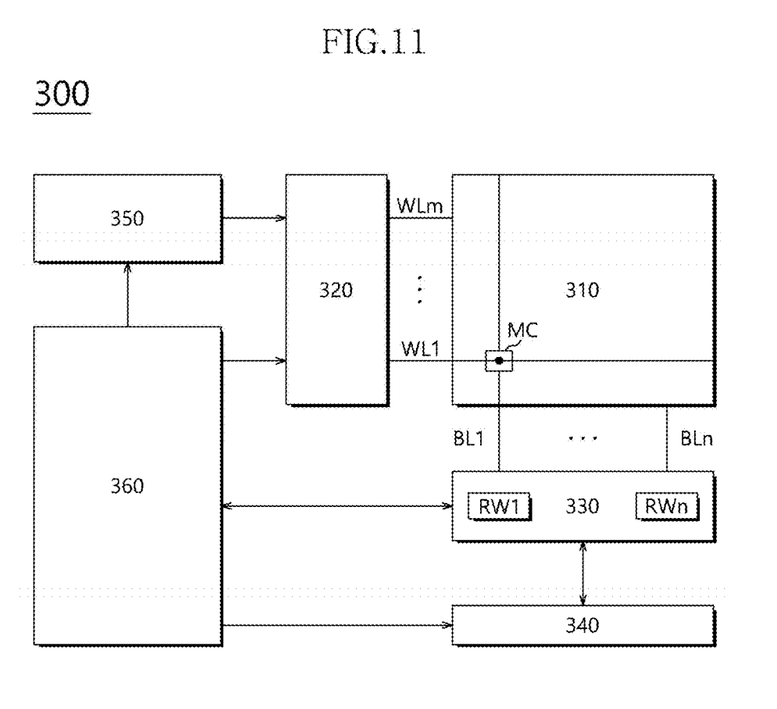
FIG. 11 is a block diagram illustrating a nonvolatile memory device included in a data storage apparatus in accordance with an embodiment.

FIG. 11 is a block diagram illustrating a nonvolatile memory device 300 included in a data storage device, such as the data storage apparatus 10 shown in FIG. 1, in accordance with an embodiment. Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged in regions where word lines WL1 to WLm and bit lines BL1 to BLn intersect with each other.

The memory cell array 310 may include a three-dimensional memory array. The three-dimensional memory array has a stacked structure arranged in a direction perpendicular to a top surface of a semiconductor substrate. Moreover, the three-dimensional memory array means a structure including NAND strings. Memory cells included in each of the NAND strings are stacked perpendicular to the top surface of the semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array, memory cells are arranged in the horizontal and vertical directions with respect to the top surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver to store data provided by the external device in the memory cell array 310 in a write operation. In another example, the data read/write block 330 may operate as a sense amplifier to read out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, which respectively correspond to the bit lines BL1 to BLn, with data input/output lines or data input/output buffers based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. In another example, an erase voltage generated in an erase operation may be applied to a well area of memory cells for which the erase operation is to be performed. In still another example, a read voltage generated in a read operation may be applied to a word line of memory cells for which the read operation is to be performed.

The control logic 360 may control general operations of the nonvolatile memory device 300 based on control signals provided by the external device. For example, the control logic 360 may control operations of the nonvolatile memory device 300 such as read, write, and erase operations of the nonvolatile memory device 300.

The above described embodiments of the present disclosure are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage apparatus, comprising:
 a storage device;
 a controller to control data input and output operations of the storage device; and
 a swap memory provided in an outside of the controller, wherein the controller includes a thread manager to perform a preparation operation on a first thread included in a task in response to a request for processing the task, request the storage device to process the first thread on which the preparation operation has been performed, perform a preparation operation on at least one subsequent thread following the first thread while the storage device processes the first thread, and store context data of the first thread and the at least one subsequent thread in the swap memory, wherein the task includes the first thread and the at least one subsequent thread, and the preparation operation includes an address mapping operation.

2. The data storage apparatus of claim 1, wherein the controller controls the data input and output operations in response to a request from a host and the swap memory is allocated to a memory provided in the host.

3. The data storage apparatus of claim 1, wherein the storage device includes a high-speed memory region and a low-speed memory region, and the swap memory is allocated to the high-speed memory region in the storage device.

4. The data storage apparatus of claim 1, wherein when a target region of the storage device to process the subsequent thread on which the pre-preparation has been completed is in an idle state, the thread manager requests the target region to process the subsequent thread, and when the target region is in a busy state, the thread manager stores the context data of the subsequent thread in the swap memory and suspends the request for processing the subsequent thread.

5. The data storage apparatus of claim 1, wherein the thread manager manages preparation states for a plurality of threads, extracts, among the plurality of threads, a specific thread to be processed in a specific region of the storage device based on the preparation states, requests the specific region to process the specific thread as the specific region is transited to an idle state, and stores context data of the specific thread in the swap memory.

6. The data storage apparatus of claim 1, wherein the preparation operation further includes a metadata management operation related to a map table.

7. The data storage apparatus of claim 1, wherein the preparation operation further includes a block management operation.

8. A data storage apparatus, comprising:
a storage device;
a controller to control data input and output operations of the storage device; and
at least one swap memory provided in an outside of the controller,
wherein the controller includes a thread manager to perform a preparation operation on a target thread to be processed by the storage device, request the storage device to process the target thread on which the preparation operation has been performed, store context data of the target thread in the at least one swap memory, and perform a preparation operation on a subsequent thread following the target thread during at least a part of a duration that the storage device processes the target thread,
wherein the preparation operation includes an address mapping operation.

9. The data storage apparatus of claim 8, wherein the controller controls the data input or output operation according to a request from a host and the storage device includes a high-speed memory region and a low-speed memory region, and the swap memory includes a first swap memory allocated to a memory provided in the host and a second swap memory allocated to the high-speed memory region of the storage device.

10. The data storage apparatus of claim 8, wherein the thread manager stores and manages thread information including a thread identifier, a target region identifier which is to process a thread, a thread attribute, and a preparation state of the thread.

11. The data storage apparatus of claim 10, wherein when a target region of the storage device to process the subsequent thread on which the preparation has been completed is in an idle state, the thread manager requests the target region to process the subsequent thread, and when the target region is in a busy state, the thread managers stores context data of the subsequent thread in the swap memory and suspends the request for processing the subsequent thread.

12. The data storage apparatus of claim 10, wherein the thread manager extracts a thread to be processed in a specific region of the storage device, requests the specific region to process the extracted thread as the specific region is transited to an idle state, and stores context data of the extracted thread in the swap memory.

13. An operating method of a data storage apparatus, the method comprising:
receiving, by a controller, an event for processing a task including at least one thread;
performing, by the controller, a preparation and attribute confirmation operation on a first thread of the task, the preparation and attribute confirmation operation including an address mapping operation for a storage device which is to process the first thread;
determining, by the controller, whether or not a target region of the storage device to process the first thread is in an idle state when the first thread is a thread which needs to access the storage device;
requesting the target region to process the first thread and storing context data of the first thread in a swap memory when the target region is in the idle state, by the controller; and
performing, by the controller, the preparation and attribution confirmation operation on a subsequent thread following the first thread during at least a part of a duration that the target region processes the first thread,
wherein the swap memory is provided in an outside of the controller.

14. The method of claim 13, wherein the preparation operation includes a metadata management operation related to a map table.

15. The method of claim 13, wherein the preparation operation further includes a block management operation.

16. The method of claim 13, wherein the event for processing the task is generated by a task processing request from a host or a background operation of the controller.

17. The method of claim 13, further comprising processing, by the controller, the first thread when the first thread is a thread which does not needs to access the storage device.

18. The method of claim 13, further comprising, when the target region is not in the idle state, storing, by the controller, thread information for the first thread in the controller, and storing, by the controller, context data of the first thread in the swap memory.

19. The method of claim 18, further comprising extracting a thread to be processed in a specific region of the storage device and requesting the specific region to process the extracted thread when the specific region is transited to the idle state, and storing context data of the extracted thread in the swap memory, by the controller.

20. The method of claim 13, wherein the swap memory is allocated to a memory provided in a host.

\* \* \* \* \*